United States Patent [19]

Beers

[11] Patent Number: 4,680,363

[45] Date of Patent: Jul. 14, 1987

[54] ONE COMPONENT SILICONE COMPOSITIONS WITH GOOD BONDING PROPERTIES

[75] Inventor: Melvin D. Beers, Schenectady, N.Y.

[73] Assignee: General Electric Company, Waterford, N.Y.

[21] Appl. No.: 571,138

[22] Filed: Jan. 13, 1984

Related U.S. Application Data

[63] Continuation of Ser. No. 363,629, Mar. 30, 1982, abandoned.

[51] Int. Cl.$^4$ .................... C08G 77/06; C08G 77/18
[52] U.S. Cl. .................... 528/14; 524/399; 524/400; 524/777; 524/783; 525/477; 528/16; 528/19; 528/34; 528/901
[58] Field of Search .................... 582/14, 16, 19; 525/477; 524/399, 400

[56] References Cited

U.S. PATENT DOCUMENTS

| | | | |
|---|---|---|---|
| 3,061,575 | 10/1962 | Russell | 528/14 |
| 3,296,161 | 1/1967 | Kulpa | 528/34 |
| 3,296,195 | 1/1967 | Goossens | 528/34 |
| 3,382,205 | 5/1968 | Beers | 528/34 |
| 3,531,424 | 9/1970 | Swanson | 528/14 |
| 4,100,129 | 7/1978 | Beers | 528/14 |
| 4,247,445 | 1/1981 | Smith et al. | 523/212 |
| 4,257,932 | 3/1981 | Beers | 525/477 |
| 4,261,758 | 4/1981 | Wright et al. | 106/287.12 |
| 4,273,698 | 6/1981 | Smith et al. | 428/447 |
| 4,308,372 | 12/1981 | Smith et al. | 528/33 |

Primary Examiner—Wilbert J. Briggs, Sr.

[57] ABSTRACT

An acid scavenger additive for a one-component, acyloxy-functional RTV composition. The acid scavenger is selected from magnesium materials, zinc materials, and aluminum materials. The acid scavenger prevents a discoloration of the metallic substrate and a decrease in bonding properties of the RTV composition to the substrate on which it is applied.

2 Claims, No Drawings

ONE COMPONENT SILICONE COMPOSITIONS WITH GOOD BONDING PROPERTIES

This application is a continuation of application Ser. No. 363,629, filed Mar. 30, 1982, now abandoned.

BACKGROUND OF THE INVENTION

The present invention relates to one-component RTV silicone rubber compositions and more particularly the present invention relates to one-component silicone rubber compositions with good bonding properties even at high humidity conditions.

One-component RTV silicone rubber compositions (RTV stands for room temperature vulcanizable) are well known. Examples of such compositions are for instance disclosed in U.S. Pat. No. 3,382,205, and U.S. Pat. No. 3,296,195 which are hereby incorporated by reference. Those compositions comprise as the basic ingredient a silanol terminated diorganopolysiloxane polymer having a viscosity varying from 100 to 1,000,000 centipoise at 25° C., an acyloxy functional cross-linking agent and a metal salt of a carboxylic acid as a curing promoter. The composition may contain fillers, self-bonding additives, flame-retardant additives and other ingredients that are necessary. The most common acyloxy functional cross-linking agent is methyl, triacetoxysilane. The most common and the most desirable curing promoter is a tin soap. The most common types of fillers are fumed silica or precipitated silica treated or untreated with various types of extending fillers such as crushed quartz, diatomaceous earth etc. A preferred self-bonding additive for such a composition is disclosed in Kulpa, U.S. Pat. No. 3,296,161 which is hereby incorporated by reference.

Irrespective of what ingredients are utilized, such compositions are packaged in a single package in the substantial absence of moisture and stored as such. When it is desired to cure the composition, the seal on the package is broken and the composition is applied to cross-link and cure by exposure to atmospheric moisture to a silicone elastomer with final cure taking place in a period of time varying anywhere from 24 to 72 hours. Other types of one-component RTV compositions are also known with various types of cross-linking agents such as alkoxy functional cross-linking agents such as are disclosed in Beers U.S. Pat. No. 4,100,129.

The acetoxy functional RTV systems are desirable in that they are relatively simple and inexpensive to produce. However, such compositions had one major drawback and that is that they gave off acetic acid upon curing which was corrosive in some applications and had a pungent odor. Nevertheless, such acetoxy functional RTV systems were utilized as sealants and gasket forming materials in the automotive industry as early as 1971 for various purposes. It was found that these acetoxy functional RTV systems had acceptable bonding properties to the substrates even at high humidity conditions that is, at a Relative Humidity of 80% or more. However, as stated, such acetoxy systems were corrosive and the acid that was released tended to discolor the metal to which it was applied. Since that time, the use of RTV in the automotive industry has increased and it has been desirable to find a gasket sealant for automotive applications which would have good bonding properties to the steel or metal substrate. Accordingly, it was highly desirable to find a one-component RTV system which was relatively non-corrosive and which could be utilized as a gasketing material in the automotive industry, and which further did not have a pungent odor. It should be noted that the alkoxy functional RTV of Beers U.S. Pat. No. 4,100,129 did have these properties, that is it was not corrosive and did not give off a pungent odor, but unfortunately such systems cured too slowly for automotive applications in most cases. Accordingly, it was highly desirable to develop a one-component RTV system that was relatively non-corrosive and did not give off a pungent odor and which had high temperature thermal properties and could be utilized satisfactorily as a gasketing sealant in automotive applications.

An example of such a sealant is disclosed in Beers, U.S. Pat. No. 4,257,932. Such sealant which was acyloxy functional differed from the traditional acetoxy functional RTV systems in that the acyloxy group in the cross-linking agent had from 5 to 30 carbon atoms and was most preferably methyl tris (2-ethyl hexanoxy) silane. There was incorporated into such a composition a plasticizer and an adhesion promoter which generally comprised a fluid polysiloxane having a high degree of tri-functionality or tetra-functionality as disclosed in the foregoing patent, fumed silica as the filler, a tin soap and preferably iron oxide as a thermal stablizer for the composition. It was disclosed in this patent there may be preferably incorporated in the composition as the self-bonding agent a silyl isocyanurate. Other modifications of this system are for instance, disclosed in Smith, et al., U.S. Pat. No. 4,247,445 which is hereby incorporated by reference. Another modification of this system was the utilization as disclosed in Mitchell, et al., U.S. Pat. No. 4,273,698 the incorporation therein of silyl maleates, silyl fumerates and silyl succinates as self-bonding additives. The foregoing silyl maleates, silyl fumerates and silyl succinates of the foregoing Mitchell et al. patent which is hereby incorporated by reference was preferable to the isocyanurates as adhesion promoters since they gave better bonding properties to the foregoing RTV systems of U.S. Pat. No. 4,257,932. Another modification of such a system was the pre-reacting of the cross-linking agent with the acyloxy functional silane cross-linking agent and preferably also the tin soap so as to yield more shelf stable compositions, as disclosed in Dziark et al., U.S. Pat. No. 4,308,372 which is hereby incorporated by reference. All of these patents disclose improvements over the basic composition of U.S. Pat. No. 4,257,932 which result in an improved composition. However, the improvements disclosed in the foregoing Mitchell, et al. patent and the Dziark et al. patent application were especially desirable in the application of the 2-ethyl hexanoxy functional RTV system in the automotive industry.

However, it was found that such compositions had a problem when applied as a gasketing material. At environments of up to 50% Relative Humidity, most of the time the composition had acceptable bonding properties. However, it was noted that such systems did create a brown film on the steel substrate. However, what was more noticeable was that in the area of 70, 80 and more percent Relative Humidity the liberated acid upon the cure of the 2-ethyl hexanoxy system would react with the iron in the steel to form iron octoate which would cause a brown oil deposit on the steel and which acted as a release agent destroying the self-bonding properties of the composition. Although there was some loss of adhesion with the acetoxy systems, it was much more noticeable with 2-ethyl hexanoxy RTV systems.

Accordingly, it was highly desirable to find a scavenger which would lock up the acid as it was released in the RTV system such that the self-bonding properties of the system would be maintained. It should be noted that self-bonding properties are highly desirable in RTV systems, otherwise a primer has to be utilized which requires additional material and labor; thus increasing the cost of producing the silicone gasket. Accordingly, it was highly desirable to solve this problem so that the 2-ethyl hexanoxy RTV system would have good self-bonding properties to metal substrates, and other substrates even at high percent Relative Humidity of 70, 80 or more.

It is one object of the present invention to provide for a hexanoxy functional RTV system with good self-bonding properties even at high percent Relative Humidity.

It is yet another object of the present invention to provide for a hexanoxy functional RTV system that does not discolor the underlying metal to which it is applied and which has good self-bonding properties to the underlying metal substrate.

It is yet an additional object of the present invention to provide for an acid scavenger for acyloxy functional RTV systems so as to maintain the self-bonding properties of the composition even at high percent relative humidity.

It is yet also an additional object of the present invention to provide a process for forming a silicone gasket in the automotive industry from an acyloxy functional RTV system in which the system contains an acid scavenger.

It is yet still an additional object of the present invention to provide a process for forming a silicone gasket against a metal substrate for automotive applications in which the silicone gasket has good self-bonding properties even at elevated percent Relative Humidity, is relatively non-corrosive, does not discolor the metallic substrate and does not have a pungent odor.

It is still an additional object of the present invention to provide for an improved silicone gasket for the automotive industry which has good self-bonding properties to metallic substrates.

These and other objects of the present invention are accomplished by means of the disclosures set forth here below.

SUMMARY OF THE INVENTION

In accordance with the above objects, there is provided by the present invention a one-component RTV silicone rubber composition with good bonding properties even at high humidity conditions comprising (A) 100 parts by weight of a silanol end-stopped diorganopolysiloxane polymer having a viscosity varying from 100 to 1,000,000 centipoise at 25° C. where organo is a monovalent hydrocarbon radical and (B) from 0.1 to 10 parts by weight of an acyloxy cross-linking agent of the formula,

$$R_m Si(OR^1)_{4-m}$$

where R is a monovalent hydrocarbon radical of 1 to 8 carbon atoms and $R^1$ is an acyloxy radical of 2 to 30 carbon atoms, m is 0 or 1: (C) from 0.01 to 10 parts by weight of a curing promoter which is a metal salt of a carboxylic acid; and (D) an effective amount of acid scavenger selected from the class consisting of zinc materials, magnesium materials, aluminum materials and mixtures thereof.

The most preferred materials within the above group are the metals, the oxides and the carboxylic acid salts. It should be noted further that the oxides must be utilized at a smaller concentration than the salts. If the oxides are utilized at somewhat above their ranges disclosed below, then what happens is that they inhibit the cure of the composition and the composition will cure slowly if at all, depending on how much of the materials has been placed in the composition. Accordingly, while zinc oxide and possibly even aluminum oxide are disclosed as fillers for acyloxy functional one-component RTV systems, nevertheless, if they are utilized in the 2-ethylhexanoxy system at above the concentration limits disclosed in the ranges below, then they will inhibit the cure of the composition. Accordingly, we will now proceed to a more detailed description of the invention.

DESCRIPTION OF PREFERRED EMBODIMENT

It must be noted that preferably there is utilized the foregoing materials of zinc, aluminum and magnesium as acid scavengers in the instant composition. The carboxylic acid salts of zinc and magnesium, operate in the present invention and the oxides of these metals should also operate within the scope of the present invention as acid scavengers.

Accordingly, only slightly basic or amphoteric metals would be desirable as acid scavengers in the instant composition. If the material is slightly basic or amphoteric it will absorb the acid that is given off during the hydrolysis to form an innocuous salt without detracting from the final cured properties of the composition. Accordingly, zinc, magnesium and aluminum compounds will function effectively in the instant case even as zinc and magnesium metals. Aluminum metal might also function effectively as an acid scavenger. There does not appear any reason why this metal powder cannot function effectively as acid scavengers in acyloxy-functional RTV systems.

In addition, it is not known whether this lack or decrease in the self-bonding properties of a composition takes place with compositions other than acyloxy-functional RTV systems at high humidity conditions. However, if the RTV system gives off an acid during cure, and the composition is applied to metallic substrate, then conceivably the same type of phenomenon would be encountered and the same scavengers as utilized in the instant invention would be suitable to prevent loss of self-bonding properties.

It should be noted that the functions of the acid scavengers of the instant case are two-fold; one, to prevent or tie up the acids that are given off so as to decrease or eliminate the formation of an oily residue at the interface of the silicone rubber composition and the metallic substrate which would cause a decrease in self-bonding properties of the composition and the other is to prevent the acid given off from attacking the metallic substrate and resulting in discoloration of the substrate. It would also appear that other types of compounds of zinc, aluminum and magnesium can be utilized as acid scavengers other than the carboxylic acid salts or the oxides or the metal powder. However, these other compounds would have to be neutral, or slightly basic. Further, although stearate salts are preferred, any carboxylic acid salts can be utilized in the instant invention as acid scavengers, other than aluminum carboxylic acid salts, and particularly carboxylic acid salts that average from 6 to 30 carbon atoms. There may be utilized individual salts, oxides, and metal powders, or there may be utilized mixtures thereof depending on the type of ingredients that are used.

Further, zinc oxide is a scavenger in the instant case although not as effective as Mg and MgO. The most effective scavengers are the magnesium materials.

Aluminum carboxylic acid salts such as an aluminum stearate are not effective scavengers. However, other aluminum compounds and the metal, although not as effective as the zinc and magnesium materials, should function to some extent as scavengers.

In this respect, there is a broad range in which the foregoing materials may be utilized in the system. That is, the amount of material that will be used in the system will depend on the type of material it is. Thus, broadly, there may be utilized an effective amount of zinc, aluminum or magnesium material or mixtures thereof up to generally 6 parts by weight of the material per 100 parts of the silanol terminated diorganopolysiloxane base polymer. If more than 6 parts are utilized, then the material would inhibit the cure of the acyloxy-functional RTV system in which it is incorporated. Preferably, the oxides and the metal powders are utilized in a concentration of anywhere from 0.05-2.0 parts by weight while the carboxylic acid salts are utilized in a concentration of anywhere from 3.0 to 6.0 parts by weight per 100 parts of the silanol base polymer. As stated, if more than the specified amount of material is utilized in the composition, the cure of the composition will be inhibited, that is, it may not cure for weeks, for months, or not at all, or it may remain tacky to the touch for a long period of time or if too much of the oxides are used, they may cause gellation of the composition before it cures completely and obtains its optimum physical properties. In this respect, it should be noted that incomplete cure results in poor physical properties of the composition as well as making it very tacky to the touch. This is highly undesirable in a silicone elastomer. As indicated above and as shown in the examples below, the amount of concentration of the ingredient that is utilized will depend upon the ingredient that is used. Its optimum concentration will have to be determined by experimentation.

The acid scavenger material is not utilized as a filler in the instant composition. That is, fillers are normally used in the composition to either cheapen the cost of the composition — for instance, extending fillers — or to increase the physical properties of the composition or give preferred select properties to the composition. Most fillers such as fumed silica are utilized in the composition to increase its physical properties such as Tear, Hardness, and Tensile Strength. This is to be distinguished in the present composition in which oxides such as aluminum oxide, magnesium oxide and zinc oxide are utilized to absorb the acid that is formed from the cross-linking agent when it hydrolyzes upon cure of the system. It should be noted that zinc oxide, and magnesium oxide have been disclosed as extending fillers for acyloxy-functional RTV systems. However, these ingredients when utilized as a filler are used not only at higher concentrations than the acid scavengers of the instant case, but they are also utilized in the traditional sense of fillers and not for absorption of acids formed by the hydrolysis of a cross-linking agent so as to preserve the self-bonding properties of the composition as is the case with the instant case.

It must also be appreciated that the present phenomenon is noted to some extent with acetoxy functional RTV's, that is, with a cross-linking agent such as methyltriacetoxysilane. However, in those cases, while the acid does attack and discolor the metal substrate, the liberation and forming of a non-oily residue at the surface does not affect the self-bonding properties of the acetoxy-functional composition anywhere near as great as is the case for the 2-ethylhexanoxy functional RTV system. Accordingly, the acid scavengers of the instant case can be utilized with those systems not depending on how desirable it is to improve the self-bonding properties. However, the acid scavengers of the instant case are effective in preventing the discoloration of the metallic substrate by the acetic acid that is given off when the acetoxy system cures. Accordingly, the acid scavengers of the present invention are especially effective in preventing discoloration of metallic substrates of all types of acyloxy functional RTV systems, and are most effective in preventing the decrease in self-bonding properties of one-component acyloxy functional RTV systems where the acyloxy group has from 5 to 30 carbon atoms. It should also be noted that the discoloration of the metallic surface, that is the discoloration of the substrate as well as the loss of self-bonding properties, is most noticeable with metallic substrates such as zinc and iron substrates. It is not noticeable and it is not the case with plastic, glass, and ceramic substrates. Accordingly, the acid scavengers of the present case find most use in acyloxy-functional RTV systems where the acyloxy group has from 5 to 30 carbon atoms, where the RTV system is to be applied to metallic substrates, such as steel.

It is postulated that this phenomenon also occurs to some extent with a masonry or concrete substrate, that is the discoloration of the substrate around the sealant, and the possible loss of self-bonding properties. Accordingly, the acid scavengers of the present case would find utility as ingredients to stop the loss of self-bonding properties of acyloxy functional RTV systems where the RTV system is to be applied to masonry substrates such as concrete as well as when it is applied to metallic substrates such as steel, but not stainless steel. An oily residue is not formed on stainless steel. As noted above, the acid scavengers absorb the acid and turn it into an innocuous salt without detracting from the physical properties of the cured composition.

This is especially important where the cured silicone elastomer is to be applied as a gasketing composition for automotive applications. Thus the composition is applied by machines or other means such as in a layer between metallic substrates on which there is applied another metallic layer thereover to form a gasket between two metallic substrates in which the cured silicone elastomeric gasket acts as a seal. Such silicone elastomeric gaskets must have quick curing properties, be fairly non-corrosive, not have an objectional odor, and have good oil resistance as well as good thermal and weathering properties at high temperatures. Especially important is that such silicone elastomer gaskets have good self-bonding adhesion to the metallic substrate. Primers can be utilized to enhance adhesion. However, the use of primers increases the cost of applying or forming the silicone gasket. Accordingly, it is desirable to have a silicone elastomeric composition with good self-bonding properties which the present invention accomplishes.

It must also be noted that within the above broad definitions of concentrations of oxides and salts that there can be utilized a combination of a salt and oxide at a concentration within the preferred ranges disclosed above. However, the optimum levels whether oxides or metal polymers are used by themselves or in combination with metal salts, must be determined by experimentation and depend to some extent on the other ingredients of the composition. Accordingly, it is left to a worker skilled in the art to determine the best or optimum concentration of metal salts or oxides in the composition to achieve the optimum acid scavenger function in an acyloxy-functional one-component RTV system.

It should be noted that generally fillers are utilized at a concentration of 10 parts or more by weight per 100 parts by weight of silanol terminated diorganopolysiloxane base polymer, and that the present acid scavengers are utilized in concentrations considerably below those levels.

With respect to the instant invention, it is now necessary to proceed to a brief description of the various components that may be present in the composition. As has been noted above, the basic polymer of the composition comprises a silanol terminated diorganopolysiloxane polymer having a viscosity varying from 100–1,000,000 centipoise at 25° C. where the organo group is a monovalent hydrocarbon radical. The monovalent hydrocarbon radical can be any monovalent hydrocarbon radical such as alkyl radicals of 1–8 carbon atoms as methyl, ethyl, propyl, etc., cycloalkyl radicals such as cyclohexyl, cycloheptyl, etc.; mononuclear aryl radicals such as phenyl, methylphenyl, ethylphenyl, etc.; alkenyl radicals such as vinyl, allyl, etc.; and fluoroalkyl radicals of 3–8 carbon atoms such as 3, 3, 3, trifluoropropyl, etc. Preferably, the silanol based polymer has the formula,

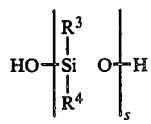

where $R^3$ and $R^4$ are independently selected monovalent hydrocarbon radicals and the value of s is such that the viscosity of the polymer varies from 100 to 1,000,000 centipoise at 25° C. and more preferably varies from 100 to 100,000 centipoise at 25° C. The radicals $R^3$ and $R^4$ can be any of the monovalent hydrocarbon radicals previously identified for the organo group for the term "organo" in the silanol terminated diorganopolysiloxane polymer. Per 100 parts of such polymer that may be present from 0.1 to 10 parts by weight of an acyloxy functional cross-linking agent of the formula,

$$R_m^{Si}(OR^1)_{4-m}$$

where R is a monovalent hydrocarbon radical of 1–8 carbon atoms and $R^1$ is an acyloxy radical of 2–30 carbon atoms, m is 0 or 1. Preferably R is methyl and $R^1$ is benzoxy or 2-ethylhexanoxy. The symbol $R^1$ can also be acetoxy. Accordingly, the three most preferred acyloxy functional cross-linking agents is methyl-triacetoxysilane, methyl-tris benzoxysilane, and methyl-tris 2-ethylhexanoxy silane.

Although the improvement of the present invention will apply in any acid-functional one-component RTV system, it is most preferably applied to acyloxy functional RTV systems, specifically those in which the acyloxy group varies from 5–30 carbon atoms. Finally, there may be present from 0.01–10 parts by weight of a curing promoter which is a metal salt of a carboxylic acid. Preferably the metal salt of a carboxylic acid that is a curing promoter is a tin salt. The most preferred tin salts are, for instance, dibutyl tin dilaurate, dibutyltindiacetate, dibutyl tin oxide, and dimethyl tin bisneodecanoate. In a case where the cross-linking agent is 2-ethylhexanoxy, then preferably the tin salts are dibutyl tin diacetate, dibutyl tin oxide and dimethyl tin bisneodecanoate disclosed in the foregoing Beers U.S. Pat. No. 4,257,932. There may also be used as disclosed in the foregoing patent from 1–10 parts by weight per 100 parts of the silanol polymer of an iron oxide thermal stabilizer.

There may also be used anywhere from 10 to 200 parts by weight of a filler. The filler, if it is a reinforcing filler, it is preferably present at a concentration of 10 to 100 parts by weight. Examples of reinforcing fillers are for instance, fumed silica and precipitated silica. These fillers may be present, treated or untreated, but preferably are treated with cyclopolysiloxane such as disclosed in Lucas U.S. Pat. No. 2,938,009, Lichtenwalner U.S. Pat. No. 3,004,859 and or silazanes as disclosed in Smith U.S. Patent 3,635,743 which are incorporated by reference in the present case. Such patents are exemplary of such treatment technology. Preferably the reinforcing type of fillers are treated so that the filler will not unduly increase the viscosity of the composition in the uncured state. The rest of the filler may be a reinforcing or extending filler. All of the filler or some of the filler can be an extending filler. Examples of extending fillers are, for instance, titanium dioxide lithopone, zirconium silicate, silica aerogel, iron oxide, diatomaceous earth, fibers, calcium carbonate, chromic oxide, zirconium oxide, alpha quartz, calcined clay, carbon black graphite, cotton, synthetic fibers, etc.

It should be noted that these extending fillers are utilized preferably in addition to the reinforcing fillers for various purposes. Most notably, they may make the composition paintable, or they may increase or reinforce the properties of the composition without unduly increasing the uncured viscosity of the composition. However they are not anywhere near as effective as the fumed silica and precipitated silica in increasing the cured physical properties of the silicone rubber composition.

Per 100 parts of the silanol terminated polymer on the base polymer of the instant composition, there may also be present from 1 to 10 parts of iron oxide as a terminal stabilizer as disclosed in the foregoing U.S. Pat. No. 4,257,932 which is hereby incorporated by reference.

There is also disclosed in the foregoing patent, that there may also be present from 2 to 20 parts by weight of a fluid polysiloxane contain tri functionality, tetrafunctionality or a mixture of tri and tetra-functionality, comprising (i) from 25 to 60 mole percent of monoalkylsiloxy units; siloxy units or a mixture of such units;

(ii) from 1 to 6 mole percent of trialkylsiloxy units;

(iii) from 34 to 74 mole percent of dialkylsiloxy units said polysiloxane containing from about 0.1 to 2% by weight of a silicone bonded hydroxyl groups.

For more information into such fluids, one is referred to the foregoing U.S. Patent 4,257,932 and U.S. Pat. No. 3,382,205, which is hereby incorporated by reference. It is generally advantageous in such compositions to decrease the amount of fumed silica in the composition so that the composition has the desirable properties of the cured state but does not have an undesirably high viscosity in the uncured state. Accordingly, when the concentration of fumed silica is reduced below a certain point, the uncured silicone rubber composition does not have a sag control. That is, it is not thixotropic. Accordingly, a sag control agent may be incorporated into the composition which is a small amount of a polyether as disclosed in Wright et al.,U.S. Pat. No. 4, 261,758 which is hereby incorporated by reference. Accordingly, per 100 parts of the silanol terminated diorganopolysiloxane polymer, there may be incorporated into the composition from 0.03 to 2.0 parts by weight of a polyether selected from a class consisting of

A—O—(C$_x$H$_{2x}$O)—B and

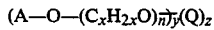
(A—O—(C$_x$H$_{2x}$O)$_{\overline{a}\overline{y}}$(Q)$_z$ wherein A and B represent radicals selected from the class consisting of hydrogen, alkyl radicals containing from 1 to 12 carbon atoms, cycloalkyl radicals containing 5 to 7 carbons in the ring, mononuclear and binuclear aryl radicals and mononuclear aryl lower alkyl groups attached to the aromatic nucleus contain a total of no more than 5 carbon atoms;

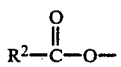
$$R^2-\overset{O}{\underset{\|}{C}}-O-$$

where $R^2$ is alkyl containing from 1 to 11 carbon atoms, Q is a residue of a polyhydric initiator radical containing at least two hydroxyl radicals selected from the class consisting of ethylene, glycol, glycerol, trimethylpolypropane, and other polyhydric alcohols having from 2 to 6 hydroxyl groups, a is a number having a value of from 4 to 2000; x is a number having a value of 2 to 4; y has a value of from 2 to 10 and z has a value of from 1 to 5; the polyether having a molecular weight of from about 300 to about 200,000. There may also be present in the composition from 0.1 to 3 parts by weight of a self-bonding agent. The self-bonding agent may be a isocyanurate as disclosed in the foregoing Beers U.S. Pat. No. 4,257,932. If the self-bonding agent is an isocyanurate, it is preferably 1, 3, 5-tris trimethoxysilylpropyl isocyanurate. Most preferably, such additive is preferably selected from silyl maleates, silyl fumerates and silyl succinates as well as siloxane maleates and mixtures thereof. Examples of such self-bonding additives which are preferred for the composition of the instant invention are for instance disclosed in the foregoing Mitchell et al. U.S. Pat. No. 4,273,698 which is hereby incorporated by reference.

Preferably the cross-linking agent is reacted with a self-bonding additive prior to being incorporated into the composition. The cross-linking agent, that is the acyloxy functional cross-linking agent and the self-bonding additive are prereacted prior to being incorporated into the composition. This is especially true if the 2-ethylhexanoxy functional silane cross-linking agent is utilized and also a self-bonding additive selected from silyl maleates, silyl fumarates, and silyl succinates. This prereacted self-bonding additive and cross-linking agent is disclosed in the patent application of Dziark et al, U.S. Pat. No. 4,308,372 which is hereby incorporated by reference. The most preferred self-bonding additive is for instance bis-trimethoxypropyl fumarate or alternatively bis-trimethoxypropyl maleate. There may be other additives in the composition as desired, such as flameretardant additives, further heat agent additives, plasticizers, etc. These additional additives will not affect the efficiency and suitability of the acid scavengers in carrying out their function.

The foregoing acid scavengers will not affect the uncured properties of the composition as far as is known. These acid scavengers may be incorporated in the composition in any manner which may be desired. That is, generally, they may be added to the catalyst component and mixed with the other ingredients as desired. The entire mixture is made substantially anhydrous and packaged as such. To cure the composition, the seal on the package is broken, and the composition applied whereupon on exposure to atmospheric moisture the composition cures to a silicone elastomer with final cure taking place in 24–72 hours. It must be appreciated that it is necessary to have a curing promoter in the composition if the composition is to cure to a full cure in the 24–72 hour period. Without a curing promoter, the cure may take a longer period of time and may not be as complete.

In the instant composition, the magnesium materials the aluminum materials, and zinc materials function as acid scavengers. That is, they absorb and react with the acid that is given up during the cure of the composition and the hydrolysis of the cross-linking agent so as to prevent such acids and salts detracting from the physical properties of the composition and will not affect deleteriously the self-bonding properties of the composition. One function of the acid scavengers is to improve the self-bonding properties of the composition or rather to prevent the acid that is liberated at a high percent relative humidity from detracting from the self-bonding properties of the composition and the other is to prevent the acid that is liberated from attacking and discoloring the metal substrate on which the silicone rubber composition is applied. As can be seen from the examples below the acid scavengers of the instant case perform their function very well. It should also be noted that the various constituents of the compositions of the instant case which have been described and which are well known have not been described in great detail since workers skilled in the art may be referred to the foregoing patents and patent applications referred to herein for further information on the subject.

The examples below are given for the purpose of illustrating the present invention. They are not given for the purpose of illustrating limits and boundaries to the instant invention. All parts are by weight.

In the following examples there was utilized a Sealant A. Sealant A comprised 66.42% by weight of a blend of silanol terminated dimethylpolysiloxane polymers having a blend viscosity of 4500 centipoise at 25° C., 3.98% of iron oxide, 6.64% by weight of a tri-functional fluid containing 3 mole percent trimethylsiloxy mono-functional units, 40 mole percent of monomethylsiloxy tri-functional units, 57 mole percent of dimethylsiloxy, di-functional siloxy units and 0.5 percent hydroxy groups. The composition also contains 0.13% by weight of U CON-1145 which is a polyether sold by the Union Carbide Corporation, Connecticut. To this mixture was added 15.94% by weight of octamethylcyclotetrapolysiloxane treated fumed sulica, 4.70% by weight of methyl tris 2-ethylhexanoxy silane 2.09% by weight of bis-trimethoxypropyl fumarate, and 0.1% by weight of dimethyltin bis-neodecanoate.

Such a sealant which was tested with various types of acid scavengers in it was compared with the following acetoxy Sealant B. Sealant B comprised 71.63% by weight of a silanol terminated dimethylpolysiloxane having 6000 centipoise viscosity at 25° C., 2.16% of iron oxide, 7.88% of tri-functional fluid containing 3 mole percent of trimethylsiloxy monofunctional units, 20 mole percent methyl trifunctional siloxy units, 77 mole percent of dimethylsiloxy di-functional units and approximately 0.5 weight percent of silanol to this mixture of Sealant B there was added 14.32% of octamethylcyclotetrapolysiloxane treated fumed silica, 3.19% of methyltriacetoxysilane, 0.79% by weight of di-tertiarybutoxydiacetoxysilane and 0.03% of dibutyltindilaurate.

EXAMPLE 1

There was prepared and tested a Sealant A and a Sealant B containing no acid scavengers in them. This data was compared with a composition containing 3.66 weight percent zinc stearate and 0.46% by weight of magnesium oxide.

All of the compositions were tested after cure for five days at 77° F. and 80% relative humidity. There were samples of Sealant A with the acid scavenger, which were further exposed to 4 hours at 250° F. to simulate the temperature increase encountered in a starting automobile engine. Results are set forth in Table I below. The shear adhesion in psi and percent cohesive failure was measured as follows:

The substrate and screen were both cleaned by first immersing in toluene and then scrubbing and drying with laboratory tissue.

The typical shear adhesion test specimen was prepared using a previously cleaned 1 inch by 4 inch by a 0.040 inch cold-rolled steel substrate. This substrate was clamped into place by means of a steel bar bolted over one end to a 9½ inch thick rigid machined steel jig. The jig was so designed as to leave one square inch of exposed surface area. The sealant was applied to the exposed surface. A 1 by 4 inch 20 mesh piece of stainless steel screen was then embedded into the sealant at a bondline thickness of 0.010 to 0.015 inches. The excess sealant was removed from the top and sides of the specimen by means of a spatula. The resulting specimen was then allowed to cure in the environments described in the examples.

After completion of cure the specimens were pulled apart at the rate of 0.5 inches per minute using a Monsanto Extensiometer.

TABLE I

| Shear Adhesion Performance after Five Days at 77° F. and 80% Relative Humidity | | | | | |
|---|---|---|---|---|---|
| Sealant B | | Sealant A | | Sealant A with Zn Stearate and MgO | |
| Initial | 4 hrs/ 250° F. | Initial | 4 hrs/ 250° F. | Initial | 4 hrs/ 250° F. |
| Shear adhesion psi | 142 | 129 | 43 | 27 | 135 | 198 |
| % Cohesive Failure | 7 | 3 | 0 | 0 | 80 | 100 |

TABLE I-continued

| Shear Adhesion Performance after Five Days at 77° F. and 80% Relative Humidity | | | | | |
|---|---|---|---|---|---|
| Sealant B | | Sealant A | | Sealant A with Zn Stearate and MgO | |
| Initial | 4 hrs/ 250° F. | Initial | 4 hrs/ 250° F. | Initial | 4 hrs/ 250° F. |

As the results indicate, the adhesion performance of the zinc stearate, magnesium oxide in Sealant A was superior to the other two specimens. In addition, this specimen exhibited no discoloration of the steel substrate whereas the acetoxy specimen had a bright brown discoloration at the sealant, metal interface and the other Sealant A specimen had a dark brown oily deposit in the sealant steel interface.

EXAMPLE 2

Sealant A and Sealant B were tested for shear adhesion with various levels of magnesium oxide. These runs were made with a direct comparison with Sealant B which contained no scavenger. Again the samples were prepared as set forth in Example 1 and exposed to 80% relative humidity for five days at 77° F. At the end of that period they were tested for shear adhesion both in psi and percent cohesive failure and also after four hours at 250° F. The results are set forth in Table II below: Sealant A and Sealant B are the same sealants as defined previously.

TABLE II

| | The Effect of Magnesium Oxide on the Adhesion Performance of Sealant A at 80% Relative Humidity and 77° F. | | | |
|---|---|---|---|---|
| MgO Level (wt. %) | Sealant A Shear Adhesion (psi/% C.F.) | | Sealant B (No Scavenger) (psi/% C.F.) | |
| | Initial | 4 hrs./250° F. | Initial | 4 hrs./250° F. |
| 0.35 | 263/90 | 217/70 | 95/0 | 107/0 |
| 0.35 (1) | 202/75 | 180/85 | 71/0 | 64/0 |
| 0.15 | 182/55 | 215/65 | 71/0 | 64/0 |

(1) This was a repeat of the preceding experiment using another newly prepared formulation.

As the results of Table II indicate, there is obtained a superior self-bonding composition with Sealant A with an acid scavenger as compared with Sealant B. It should be noted that the optimum level of acid scavenger, that is, of magnesium oxide alone appeared to be 0.35% by weight. Again similar tests were run utilizing zinc stearate as the acid scavenger in Sealant A as compared to Sealant B utilizing no acid scavenger in the composition. Again, after the shear adhesion specimens were prepared, the samples were exposed to 80% Relative Humidity for five days at 77° F. At the end of that period, samples were tested for shear adhesion and percent cohesive failure. Other samples were further exposed for four hours at 250° F. before being tested for shear adhesion and percent cohesive failure. The results for the zinc stearate and zinc oxide at various levels are indicated in Table III below. As noted previously, Sealant B was the formulation as identified previously and wherein the Sealant B samples had no acid scavenger in them.

TABLE III

The Effect of Zinc Stearate on the
Adhesion Performance of Sealant A
at 80% Relative Humidity and 77° F.

|  | Sealant A Shear Adhesion (psi./% C.F.) | | Sealant B (No Scavenger) (psi./% C.F.) | |
| --- | --- | --- | --- | --- |
|  | Initial | 4 hrs./250° F. | Initial | 4 hrs./250° F. |
| Zinc Stearate Level (wt. %) | | | | |
| 3.8 | 125/75 | 210/100 | 157/3 | 153/10 |
| ZnO Level (wt. %) | | | | |
| 0.35 | 128/10 | 191/95 | 71/0 | 64/0 |
| 0.70 | 189/40 | 291/100 | 71/0 | 64/0 |

It should be noted that in the above experiment the zinc oxide containing sealant samples exhibited some surface tack after curing for five days at 50% R.H. but not after the 80% R.H. cure or exposure to 250° F. for four hours. As the results in Table III show, both zinc stearate and zinc oxide are effective acid scavengers for the Sealant A system. Although, the levels at which each one was effective differed markedly as explained above.

EXAMPLE 3.

There was prepared a Sealant C similar to Sealant A comprising the following composition: 66.42% by weight of a silanol terminated dimethylpolysiloxane polymer blend having a viscosity of 4500 centipoise plus or minus 500 centipoise at 25° C., 3.98% of iron oxide; various levels of acid scavengers; 6.64% by weight of a tri-functional fluid of Sealant A; 0.13% by weight of a polyether which sold under the name of Pluracol-7, a polyether sold under the above tradename by the Wyandotte Chemicals Corporation; 15.94% of octamethacyclotetrasiloxane treated fumed silica filler; 4.70% of methyl tris 2-ethylhexanoxy silane; 2.09% by weight of bis-tri-methoxy propyl fumerate (or maleate) and 0.10% of dimethyl tin bisneodecanoate. These samples were prepared as in Example 1 which were exposed to 80% Relative Humidity, 80° F. for five days. The samples were also part baked for four hours at 250° F. to simulate engine heat up. The shear adhesion and % cohesion failure results of Sealant C mixed with various levels of zinc stearate and magnesium oxide under the foregoing conditions are listed in Table IV.

TABLE IV

Effect of Zinc Stearate - Magnesium
Oxide Combinations on the Adhesion
Performance of Sealant C at 80° F./
80% R.H.[(1)]

| Zinc Stearate Level, Wt. % | 10.8 | 3.6 | 2.6 | 0 |
| --- | --- | --- | --- | --- |
| Magnesium Oxide. Wt. % | 1.3 | 0.5 | 0.3 | 0 |
| Shear Adhesion, psi/% C.F. | 35/90[(2)] | 198/100 | 212/100 | 30–65/0 |

[(1)]Samples were also post-baked for 4 hours./250° F. to simulate engine heat-up. For quality control purposes, this is for 8 hrs./150° F.
[(2)]Inhibition of Cure Noted at 10.8 Wgt. % Zinc Stearate.

EXAMPLE 4

Into Sealant C which was prepared as in Example 3 there were incorporated various amounts of zinc stearate by itself as an excellent scavenger as compared to Sealant C without any acid scavenger as a control. The composition was the same in each case except there was utilized the various levels of zinc stearate as indicated in Table V below. The results are set forth in Table V.

TABLE V

Effect of Zinc Stearate on
Sealant C Adhesion Performance
at 80° F./80% R.H.
(Cure Times 5 Days)

| Zinc Stearate Level, Wt. % | 10.8* | 3.8 | 2.6 | 1.3 | 0 |
| --- | --- | --- | --- | --- | --- |
| Shear Adhesion, psi/% C.F. (Steel Substrate) | 35/90 | 210/100 | 45/0 | 62.5 | 30–65/0 |

*Cure Inhibited
MgO Included

The results of Table V were samples which were aged for five days at 80% Relative Humidity and 80° F. Each sample was then post-baked for four hours at 250° F. to simulate engine heat-up. As the results in Table V indicate, zinc stearate was a very effective acid scavenger and self-bonding improver at a level of 3.8% by weight. Similar tests on the same Sealant C composition but with various levels of magnesium oxide showed similar improvements in self-bonding properties of the Sealant C composition after the sample was aged at 80% Relative Humidity and 80° F. for five days and then postbaked for four hours at 250° F. Each sample was subjected to this procedure. The resulting shear adhesion tests which were carried out in the same manner as set forth in Example 1 are set forth in Table VI below.

TABLE VI

The Effect of Magnesium Oxide on
Sealant C Adhesion Performance at
80° F./80% R.H.* (Cure Time - 5 Days)

| Magnesium Oxide Level (Maglite D) Wt. % | 1.4 | 0.5 | 0.33 | 0.23 | 0.16 | 0.13 | 0.10 | 0 |
| --- | --- | --- | --- | --- | --- | --- | --- | --- |
| Shear Adhesion, | 45/0 | 130/30 | 165/85 | 215/95 | 291/100 | 215/70 | 248/100 | 30–65/0 |

*Postbaked 4 hours./250° F.

As the results of Table VI show magnesium oxide appeared to be very effective as an acid scavenger to improve the self-bonding properties of the Sealant C composition at levels of 0.16% by weight or somewhat less. The results of both Tables V and VI show that zinc stearate and magnesium oxide were effective self-bonding improvements for the 2-ethylhexanoxy functional RTV systems. It should be noted that the magnesium oxide utilized in these tests was sold under the name Maglite-D, a tradename of Merck Chemical Corporation, of New Jersey. As the results above indicate, there is obtained advantageous improvement in self-bonding properties of acyloxy-functional RTV systems and especially those in which the cross-linking agent is 2-ethylhexanoxy functional at 80% Relative Humidity even when the cured composition is exposed to 80% Relative Humidity for extended periods of time. The most effective acid scavengers for accomplishing this purpose have been found to be zinc stearate, zinc oxide, magnesium oxide and magnesium metal. However, other materials, that is other metal salts of carboxylic acids other than the foregoing metals of zinc and magnesium should be just as effective as the zinc stearate. Preferably the carboxylic acid group carbon content varies from 6 to 30 carbon atoms. In addition, all the oxides should also function effectively although at lower levels as the foregoing magnesium oxide and zinc oxide, as well as the metal powders. No formation of gas was noted with the magnesium and zinc powders. Further, although the present system was devised when the acyloxy RTV system is to be applied to a metallic substrate, it can be appreciated that similar advantages will also be found in the utilization of such acid scavengers when the acyloxy-functional RTV system is applied to other types of substrates.

EXAMPLE 5

In Examples 5-9, the shear adhesion specimens were first cured for five days under the conditions described and then post-baked for four hours at 250° F. In each experiment the conditions for the control were 77° F. and 50% Relative Humidity. The elevated humidity environment was maintained at 80° F. and 80 percent Relative Humidity. In each case, in Examples 5-9, the composition was the same as Sealant A on page 26 except for the type and amount of the scavenger defined below. The Control composition was the same as Sealant A with the same amount of scavenger and cured under normal conditions. A composition the same as Sealant A was prepared into which aluminum stearate was incorporated at a concentration of 2.78 weight percent. The control sealant contained the same amount of scavenger.

Shear Adhesion Results:

1. Control: the sample was cured 5 days at 77° F. and 50% Relative Humidity followed by a post-bake of four hours at 250° F. Shear Adhesion=247 psi at 100% cohesive failure.
2. Elevated Humidity: The sample was cured five days at 80° F. and 80% Relative Humidity followed by a post-bake of four hours at 250° F. Shear Adhesion=3 psi at 0% cohesive failure.

Conclusion

Aluminum stearate does not function as a scavenger.

EXAMPLE 6

Alumina (aluminum oxide) was incorporated in the Sealant A composition at a concentration of 0.5 weight percent. The control sealant contained the same amount of scavenger.

1 Control: Shear Adhesion=292 psi at 100% cohesive failure.
2. Elevated Humidity: Shear Adhesion=39 psi at 0% cohesive failure.

The test conditions were the same as in Example 5.

Conclusion

Aluminum oxide has a low degree of scavenger activity in comparison with the control shown in Example 9.

EXAMPLE 7

Powdered magnesium metal of a particle size of 70-80 mesh was incorporated into Sealant A composition at a concentration of 0.71 weight percent. The control sealant contained the same amount of scavenger.

1. Control: Shear Adhesion=190 psi at 90% cohesive failure.
2. Elevated Humidity: Shear Adhesion=212 psi at 96% cohesive failure.

The test conditions were the same as in Example 5.

Conclusion

Magnesium metal is an excellent scavenger.

EXAMPLE 8

Powdered zinc metal of a particle size of about 200 mesh was incorporated in the Sealant A composition at a concentration of 0.71 weight percent. The Control contained the same amount of scavenger.

1. Control: Shear Adhesion=184 psi at 100% cohesive failure.
2. Elevated Humidity: Shear Adhesion=105 psi at 0% cohesive failure.

The test conditions were the same as in Example 5.

Conclusion

Zinc metal is a *mildly active scavenger.*

EXAMPLE 9

No test scavenger was used in this example. The composition was the same as Sealant A. This is the experimental control.

1. Standard Conditions: Shear Adhesion=288 psi at 97% cohesive failure.
2. Elevated Humidity: Shear Adhesion=11 psi at 0% cohesive failure.

Alumina, magnesium metal and zinc have varying degrees of activity as scavengers as indicated above

What is claimed is:

1. A process for forming a one component RTV silicone rubber composition with good bonding properties at high humidity conditions, comprising:
   (1) mixing
   (A) 100 parts by weight of a silanol end-stopped diorganopolysiloxane polymer having a viscosity from 100 to 1,000,000 centipoise at 25° C. where the organo groups are monovalent hydrocarbon radicals;
   (B) from 0.1 to 10 parts by weight of an acyloxy functional cross-linking agent of the formula

where R is a monovalent hydrocarbon radical of 1 to 8 carbon atoms, $R^1$ is an acyl radical of 2 to 30 carbon atoms, and m is 0 or 1;
   (C) from 0.01 to 10 parts by weight of a curing promoter which is a salt of a carboxylic acid; and
   (D) about 4 parts by weight of a magnesium or zinc salt of a carboxylic acid as an acid scavenger.

2. A process for forming a one-component RTV silicone rubber composition with good bonding properties even at high humidity conditions, comprising:
   (1) mixing
   (A) 100 parts by weight of a silanol end-stopped diorganopolysiloxane polymer having a viscosity from 100 to 1,000,000 centipoise at 25° C., where the organo groups are monovalent hydrocarbon radicals;

(B) from 0.1 to 10 parts by weight of an acyloxy functional cross-linking agent of the formula $$R_m Si(OR^1)_{4-m}$$

where R is a monovalent hydrocarbon radical of 1 to 8 carbon atoms and $R^1$ is an acyl radical of 2 to 30 carbon atoms, m is 0 or 1;

(C) from 0.01 to 10 parts by weight of a curing promoter which is a metal salt of carboxylic acid; and (D) about 4 parts by weight of acid scavenger selected from the group consisting of zinc stearate and magnesium stearate.

* * * * *